United States Patent [19]

Blair et al.

[11] Patent Number: 5,577,630
[45] Date of Patent: Nov. 26, 1996

[54] COMPOSITE CONFORMABLE PRESSURE VESSEL

[75] Inventors: Michael D. Blair; Richard Kunz; Mark J. Warner, all of North Ogden; Kevin Davis, Ogden; Edward Wolcott, Providence; Darrel Turner; John Bennett, both of Brigham City, all of Utah

[73] Assignee: Thiokol Corporation, Ogden, Utah

[21] Appl. No.: 382,502

[22] Filed: Feb. 2, 1995

[51] Int. Cl.⁶ .................................................. B65D 8/00
[52] U.S. Cl. .......................... 220/581; 220/586; 220/23.2
[58] Field of Search .................................. 220/586, 585, 220/584, 581, 565, 4.13, 23.2

[56] References Cited

U.S. PATENT DOCUMENTS

| | | | |
|---|---|---|---|
| 863,447 | 8/1907 | Rice | 220/23.2 X |
| 1,668,179 | 5/1928 | Williams | 220/565 X |
| 2,095,256 | 10/1937 | Horton | 220/565 |
| 2,726,004 | 12/1955 | McLeod | 220/23.2 |
| 3,057,509 | 10/1962 | Bernd | 220/63 |
| 3,171,563 | 3/1965 | Bernd | 220/3 |
| 3,528,582 | 9/1970 | Rigollot | 220/581 |
| 3,645,415 | 2/1972 | Phelps | 220/22 |
| 3,756,177 | 10/1973 | Ritchey et al. | 60/253 |
| 4,123,307 | 10/1978 | Lemelson | 156/172 |
| 4,182,254 | 1/1980 | Secord | 114/74 A |
| 4,196,808 | 4/1980 | Pardo | 220/23.2 X |
| 4,343,409 | 8/1982 | Silver | 220/72 |
| 4,374,478 | 2/1983 | Secord et al. | 73/863.31 |
| 4,589,563 | 5/1986 | Born | 220/3 |
| 4,817,855 | 4/1989 | Bunkoczy | 228/171 |
| 4,819,426 | 4/1989 | Singer et al. | 60/250 |
| 4,946,056 | 8/1990 | Stannard | 220/584 |
| 4,961,699 | 10/1990 | Moore | 425/387.1 |
| 5,060,470 | 10/1991 | VanName | 60/253 |
| 5,070,691 | 3/1991 | Smith et al. | 60/245 |
| 5,253,778 | 10/1993 | Sirosh | 220/590 |
| 5,259,901 | 11/1993 | Davis et al. | 156/154 |
| 5,284,267 | 2/1994 | Polletta et al. | 220/4.14 |

FOREIGN PATENT DOCUMENTS 1290641  9/1962  France .

Primary Examiner—Steven M. Pollard
Attorney, Agent, or Firm—Madson & Metcalf; Ronald L. Lyons

[57] ABSTRACT

A pressure vessel for holding a pressurized fluid such as compressed natural gas ("CNG") includes two end cells and zero or more interior cells. The cell geometry ensures that the cells meet one another at tangential circular surfaces, thereby reducing the tendency of adjacent cells to peel apart. A web secured about the cells includes two sheets that are tangent to the cells. Unused volumes between the cells and the web contain wedges of foam or rubber. A valve provides fluid communication between the interior of the pressure vessel and a pressurized fluid line. The filled weight of one pressure vessel does not exceed the filled weight of a conventional gasoline tank that occupies substantially the same space as the pressure vessel. The pressure vessel may be configured with exterior recesses for engaging conventional gasoline tank straps.

27 Claims, 6 Drawing Sheets

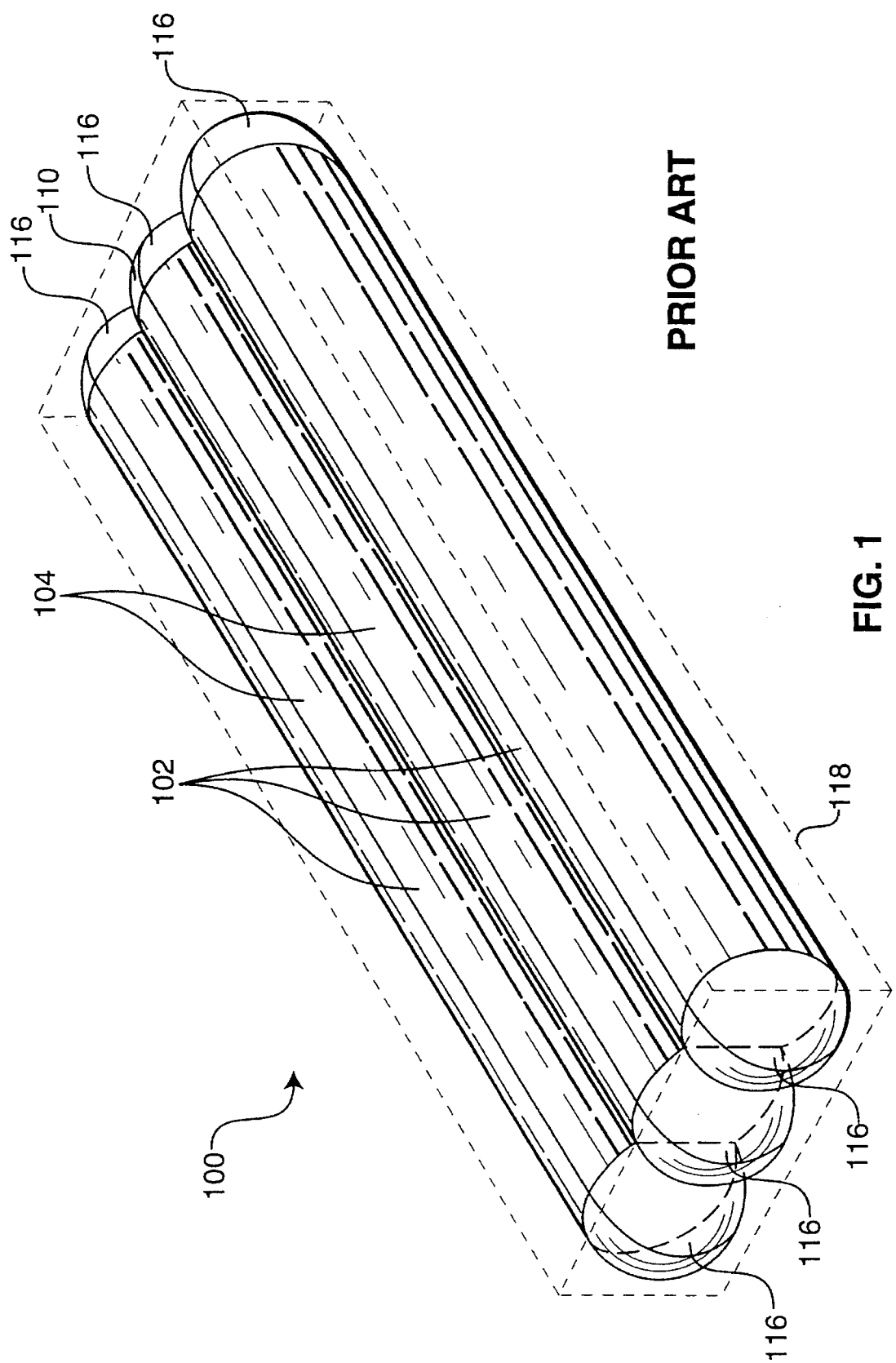

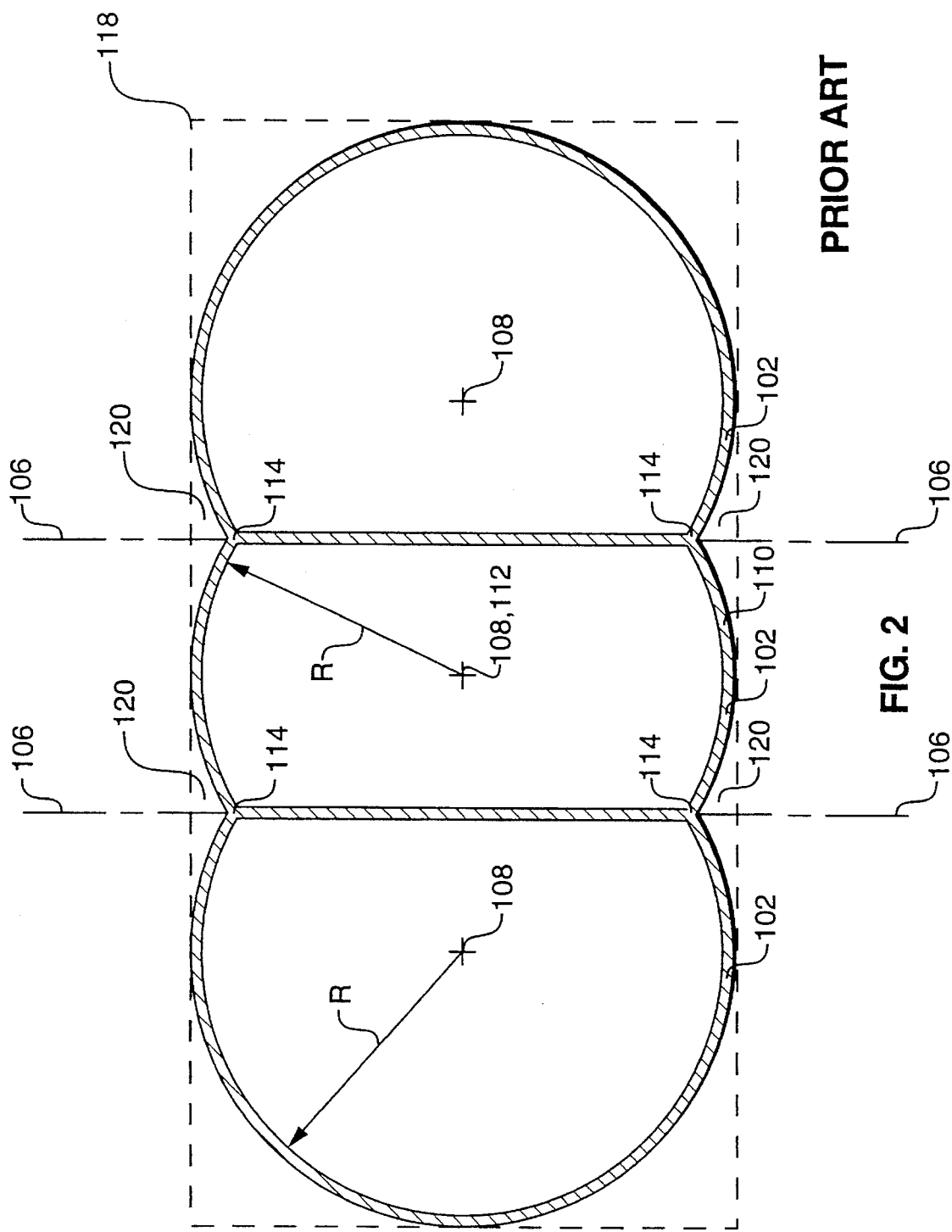

COMPOSITE CONFORMABLE PRESSURE VESSEL

FIELD OF THE INVENTION

The present invention relates to a pressure vessel for holding compressed fluids, and more particularly to a composite pressure vessel having a plurality of storage cells which meet tangentially within a composite web to closely and efficiently approximate a rectangular volume.

TECHNICAL BACKGROUND OF THE INVENTION

Pressure vessels are widely used to store liquids and gases under pressure. The storage capacity of a pressure vessel depends on the internal volume of the pressure vessel and the pressure the vessel is capable of safely containing. In addition to its storage capacity, the size, internal shape, external shape, and weight of the pressure vessel are often important in a particular application.

One growing application of pressure vessels is the storage of compressed natural gas ("CNG"). CNG is increasingly viewed as preferable to gasoline for fueling vehicles. CNG generally burns cleaner than gasoline, leading to a visible reduction in air pollution and corresponding reductions in health care costs. Natural gas is also a relatively abundant fuel. Accordingly, approaches have been devised for converting gasoline-fueled vehicles by retrofitting them to use CNG instead of gasoline.

Known approaches to retrofitting a vehicle for use with CNG include replacing the gasoline tank with conventional natural gas storage cylinders. Unfortunately, the use of conventional CNG cylinders restricts the driving range of the converted vehicle to about 120 to 140 miles, which severely limits consumer acceptance of such conversions. The driving range of such a converted vehicle could be increased by simply adding more CNG storage cylinders. This could be done, for example, by mounting the additional CNG cylinders within the trunk of the vehicle. However, it is generally desirable to fit the CNG storage cylinders within the limited space previously occupied by the gasoline tank.

One suggested approach for increasing the vehicle's driving range is to carry more CNG within the same storage cylinders. This is accomplished by pumping more CNG into the storage cylinders, thereby increasing the pressure within the storage cylinders. However, increasing the storage pressure often requires thickening the walls of the storage cylinders to provide them with sufficient structural strength to resist the higher pressure. Increasing the wall thickness requires either an increase in the external size of the storage cylinders, thereby preventing storage of the cylinders in the space previously occupied by the gasoline tank, or a reduction of the internal storage volume of the cylinders, thereby reducing the volume of stored CNG and hence reducing the vehicle's driving range. Thickening the walls also increases the weight of the storage cylinders, thereby decreasing the fuel efficiency of the vehicle.

Other approaches to increasing the driving range of vehicles fueled by CNG propose varying the shape of CNG storage containers. Currently, spheres, cylinders, and certain combinations of spherical and cylindrical sections are favored. As illustrated in FIGS. 1 and 2, one conventional pressure vessel 100 includes several lobes 102 secured together. Each lobe 102 is geometrically defined as a portion of a "tube-and-dome" shape. Geometrically, a tube-and-dome includes a straight tube 104 which is circular with radius R in transverse cross-section (see FIG. 2). Two lobes 102 are combined by slicing each lobe 102 along a plane 106 that is parallel to the longitudinal axis 108 of the tube 104. The truncated faces of the two lobes 102 are then secured against one another. Each of one or more center lobes 110 is thus sliced along two planes 106 parallel to the longitudinal axis 112 of the center lobe's tube. In the resulting container 100, the lobes 102 are not tangent to one another at junctions 114 where they meet. Each tube 104 is capped at each end by a portion of a hemispherical dome 116 having the same radius R as the tube 104.

Such tube-and-dome containers have several drawbacks when employed in applications requiring substantially rectangular pressure vessels. Such applications include, but are not limited to, storage of CNG for use in fueling a vehicle. The vehicle may be a vehicle retrofitted with CNG tanks after previously being fueled by gasoline, or it may be a vehicle designed from the start to run on CNG.

The drawbacks of tube-and-dome geometry arise from differences between that geometry and a substantially rectangular geometry. In the case of retrofitted vehicles, the desire for substantially rectangular vessels arises because many gasoline tanks are shaped like substantially rectangular shells, as illustrated generally by a phantom rectangular shell 118 in FIGS. 1 and 2. In the case of vehicles designed initially to use CNG, the preference for a substantially rectangular pressure vessel may arise from other design considerations. In either case, a single tube-and-dome lobe 102 is a very poor approximation to such rectangular volumes.

Arranging truncated portions of several tube-and-dome lobes 102 together to form the pressure vessel 100 improves the approximation, but large wedge-shaped unused volumes 120 nonetheless remain which are not used for CNG storage. The unused volumes 120, which are defined by the circular walls of adjacent tube-and-dome lobes 102, may occupy a significant percentage of the internal volume of the rectangular shell 118. Eliminating the unused volumes 120 entirely would require a CNG container which is substantially a rectangular shell in shape. But building a rectangular shell-shaped CNG vessel sufficiently strong to resist typical CNG storage pressures would require excessively thick walls, because the rectangular shell is so far removed in shape from a sphere.

In addition to the unused volumes 120, the vessel 100 has the disadvantage that the lobes 102 tend to peel apart at the junctions 114 because of stresses that occur at the junctions 114. Thickening the walls of the lobes 102 to overcome the peeling tendency reduces the storage capacity of the container 100 or increases its size, and also increases the container's weight.

Thus, it would be an advancement in the art to provide a pressure vessel which approximates a rectangular volume.

It would also be an advancement to provide such a pressure vessel which facilitates the retrofitting of gasoline vehicles by having an external shape compatible with the rectangular shell shape of the exterior of the gasoline tank.

It would be a further advancement to provide such a pressure vessel which has generally circular cross-sections.

It would also be an advancement to provide such a pressure vessel that resists the tendency to peel apart when subjected to internal storage pressures.

Such a pressure vessel is disclosed and claimed herein.

BRIEF SUMMARY OF THE INVENTION

The present invention provides a pressure vessel having a novel geometry. In one embodiment, the pressure vessel is configured to resist pressure from compressed natural gas ("CNG") stored within the vessel and the vessel approximates the rectangular shape of a conventional gasoline tank. The pressure vessel resists a normal operating pressure of up to about 3,600 p.s.i. and has sufficient burst strength to resist about three times the normal operating pressure, namely, a burst strength of about 11,000 p.s.i.

The novel geometry of the present pressure vessel is described herein through reference to geometric operations such as slicing a shape with a plane. These geometric operations do not necessarily correspond to manufacturing methods, but are rather illustrations of the geometry of the pressure vessel to be manufactured.

One embodiment of the pressure vessel includes two end cells. Each end cell includes a semi-cylindrical outer wall. The outer wall geometry is defined by slicing a first cylindrical container with a plane through its longitudinal axis to create a half-cylinder. Each end cell also includes a quarter-cylindrical upper wall and a quarter-cylindrical lower wall. The upper wall and lower wall are unitary with the outer wall. The upper wall geometry is defined by slicing a second cylindrical container which has the same length as the first cylindrical container but which also has a smaller radius. The second cylindrical container is sliced with two perpendicular planes through its longitudinal axis. The lower wall is similarly defined by slicing a third cylindrical container with two perpendicular planes. A rectangular section connects the lower end of the upper wall with the upper end of the lower wall. The end of each cell thus defines a curve which is herein denoted a "polyradial" curve, in reference to the differing radii of the outer and upper-or-lower walls.

Each end of the joined half- and quarter-cylindrical walls is capped by a cap. Each cap corresponds in shape (not necessarily in materials actually employed) to an elastic sheet secured to a closed polyradial curve as a boundary condition and then subjected to a uniform deformation pressure.

The novel geometry of the present invention is further illustrated by a cross-section taken transverse to the longitudinal axis of one of the end cells. The cross-section defines a polyradial curve which includes an arcuate outer wall, an arcuate upper wall, and an arcuate lower wall. The outer wall corresponds to the semi-cylinder with the larger radius, which is therefore termed the outer wall radius. The upper wall, which has one end unitary with the outer wall at an upper-outer junction, corresponds to the upper quarter-cylinder, and thus has an upper wall radius that is less than the outer wall radius. The lower wall, which has one end unitary with the outer wall at a lower-outer junction, corresponds to the lower quarter-cylinder. In this embodiment the lower wall radius is equal to the upper wall radius, but these radii may differ in other embodiments. Thus, in general a polyradial cross-section may include circular arcs having either two or three different radii.

Alternative embodiments of the pressure vessel include one or more interior cells secured between the end cells. In cross-section, each interior cell has a semi-cylindrical upper portion secured to a semi-cylindrical lower portion by two straight inner walls. The interior cells are secured tangent to and adjacent to one another, with the end cells secured tangent to and adjacent to the outermost interior cells.

The radii of the semi-cylindrical interior wall upper and lower portions are the same as the radii of the quartercylindrical upper wall and lower wall, respectively, of the end cells. Thus, the end cells and interior cells of the present pressure vessel are generally tangent to one another where they meet, unlike the lobes of previously known pressure vessels. This aspect of the novel geometry of the present pressure vessel reduces the tendency of adjacent cells to peel apart.

A web is secured about the end cells and about any interior cells that are present. The web includes a substantially planar upper sheet which is generally tangent to the upper-outer junction of each of the end cells and to the semi-cylindrical upper portion of each interior cell. The web also includes a substantially planar lower sheet which is generally tangent to the lower-outer junction of each of the end cells and to the semi-cylindrical lower portion of each interior cell. The web strengthens the pressure vessel by assisting in holding the cells tangent to one another and by reinforcing the cell walls.

The pressure vessel of the present invention defines wedge-shaped unused volumes between the web and the cells that are not used for pressurized fluid storage. In one embodiment, the pressure vessel is strengthened by substantially filling the unused volumes with wedges of foam or rubber disposed between the web sheets and the cells.

The pressure vessel of the present invention includes a valve capable of selectively providing fluid communication between an interior chamber of the pressure vessel and an exterior pressurized fluid line such as a CNG line connected to the valve. The interiors of the several cells that form the present pressure vessel are configured to be in fluid communication with one another, so that only one valve is needed to control fluid flow in and out of the pressure vessel. The valve includes a pressure relief mechanism to bleed off pressurized fluid if the internal pressure of the pressure vessel exceeds a predetermined value. The valve also includes a fusible plug to provide emergency venting in the presence of high temperatures.

Advantageously, the pressure vessel of the present invention facilitates retrofitting gasoline-fueled vehicles because the filled weight of the pressure vessel does not exceed the filled weight of a conventional gasoline tank occupying substantially the same volume envelope. In addition, the pressure vessel may be configured with fixtures defining exterior recesses capable of engaging conventional gasoline tank straps. Thus, the same tank straps previously used to secure the gasoline tank to the vehicle can be used, without substantial alteration or further testing, to secure the pressure vessel to the vehicle.

Those of skill in the art will appreciate that the pressure vessel of the present invention is not limited to use in retrofitting vehicles. The present invention also has applications in the design of new vehicles, as well as in other applications which benefit from the use of pressure vessels having a substantially rectangular shape.

Pressure vessels according to the present invention are manufactured with metal or composite parts. In one embodiment, the cells are formed of a liner such as a metallic foil or a synthetic polymer film to provide gas impermeability. The liner is overwrapped by a composite layer using filament winding or another method familiar to those of skill in the art. Interior ports may be provided in the cell walls for fluid communication between cells, or an external manifold may be subsequently attached to provide such communication. The cells are positioned adjacent one another, and all the cells are then overwrapped by a composite web. The composite used in the cells, the web, or both may include carbon, glass, graphite, aramid, or other known fibers bound in a thermoplastic or thermoset resin.

In another embodiment, the cells are formed of metal by stamping, extruding, or another process familiar to those of skill in the art. The metal pieces are welded together, and are then overwrapped with a composite web. Examples of suitable metals are titanium, aluminum, and steel.

In summary, the present invention provides a pressure vessel in which the cells meet tangentially and are overwrapped with a reinforcing web. The novel geometry of the pressure vessel provides generally circular cross-sections which resist the tendency to peel apart in response to internal pressure. The exterior of the pressure vessel conforms generally to the external shape of a conventional gasoline tank and includes fixtures defining recesses to engage conventional gasoline tank straps.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which:

FIG. 1 is a perspective view of a prior art pressure vessel;

FIG. 2 is a cross-section taken along line 2—2 in FIG. 1;

DETAILED DESCRIPTION OF THE PREFERRED EMBODIMENTS

Figure 7:
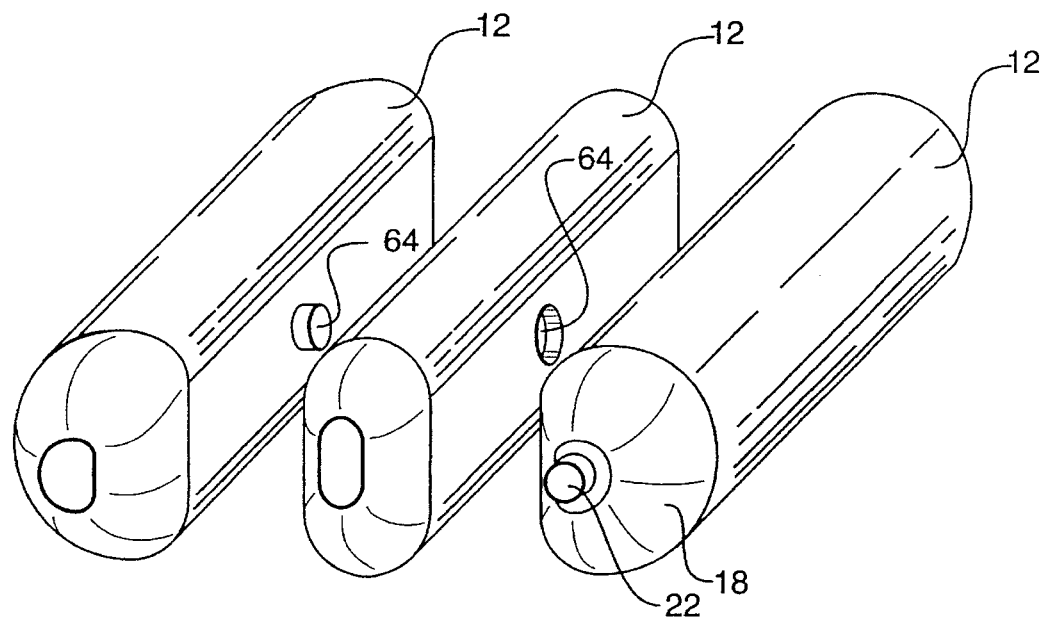
FIG. 7 is an exploded perspective view illustrating selected components of the embodiment shown in FIG. 3.

Reference is now made to the figures wherein like parts are referred to by like numerals. The present invention relates to a pressure vessel generally, and more specifically to a tank for holding compressed natural gas ("CNG") for fueling a vehicle (not shown). One embodiment of the present pressure vessel is indicated generally at 10 in FIG. 3. This embodiment of the pressure vessel 10 includes three cells 12 secured within a web 14. The three cells 12 include a left end cell 16, a right end cell 18, and one interior cell 20. The cells 12 have a novel geometry and other important characteristics which will be described in detail after the other main components of the pressure vessel 10 are noted.

The right end cell 18 is preferably configured with a valve 22 to control fluid flow in and out of the pressure vessel 10. The valve 22 preferably includes pressure relief means for the controlled release of pressurized fluid from the pressure vessel 10 if the internal pressure of the pressure vessel 10 exceeds a predetermined value. In one embodiment the pressurized fluid is CNG and the predetermined value for controlled fluid release is about 3,600 p.s.i.

Suitable pressure relief means include a mechanical pressure relief mechanism of the type familiar in the art which is configured to bleed off CNG at a set predetermined pressure. Suitable pressure relief means also preferably includes a fusible plug to provide emergency venting in the presence of high temperatures, such as temperatures which could raise the pressure within the pressure vessel 10 above the predetermined value. It is presently preferred that the fusible plug be configured to provide emergency venting when temperatures in the tank rise above about 212 degrees Fahrenheit. Those of skill in the art will appreciate that the pressure vessel 10 could also be usefully configured with the valve 22 at another location or with more than one valve.

Wedge-shaped supports 24 are positioned to extend lengthwise between the cells 12 and the web 14. For clarity of illustration, portions of these supports 24 have been cut away in FIG. 3. The supports 24 generally fill the wedge-shaped unused volume between the cells 12 and the web 14 to provide structural support to the web 14. Suitable materials for the supports 24 include rubber, resilient foam, and other rigid or semi-rigid materials familiar to those in the art.

The exterior of the pressure vessel 10 is configured with fixtures defining recesses 25 for accepting and retaining conventional gasoline tank straps (not shown). It is presently preferred in retrofitting applications that the exterior of the pressure vessel 10 also conform generally in shape to a conventional gasoline tank, both in its generally rectangular shape and in its dimensions. The recesses 25 and other conforming features of the pressure vessel 10 facilitate replacement of a conventional gasoline tank with the pressure vessel 10 during conversion of the vehicle from a gasoline-fueled configuration to a CNG-fueled configuration.

Figure 4:
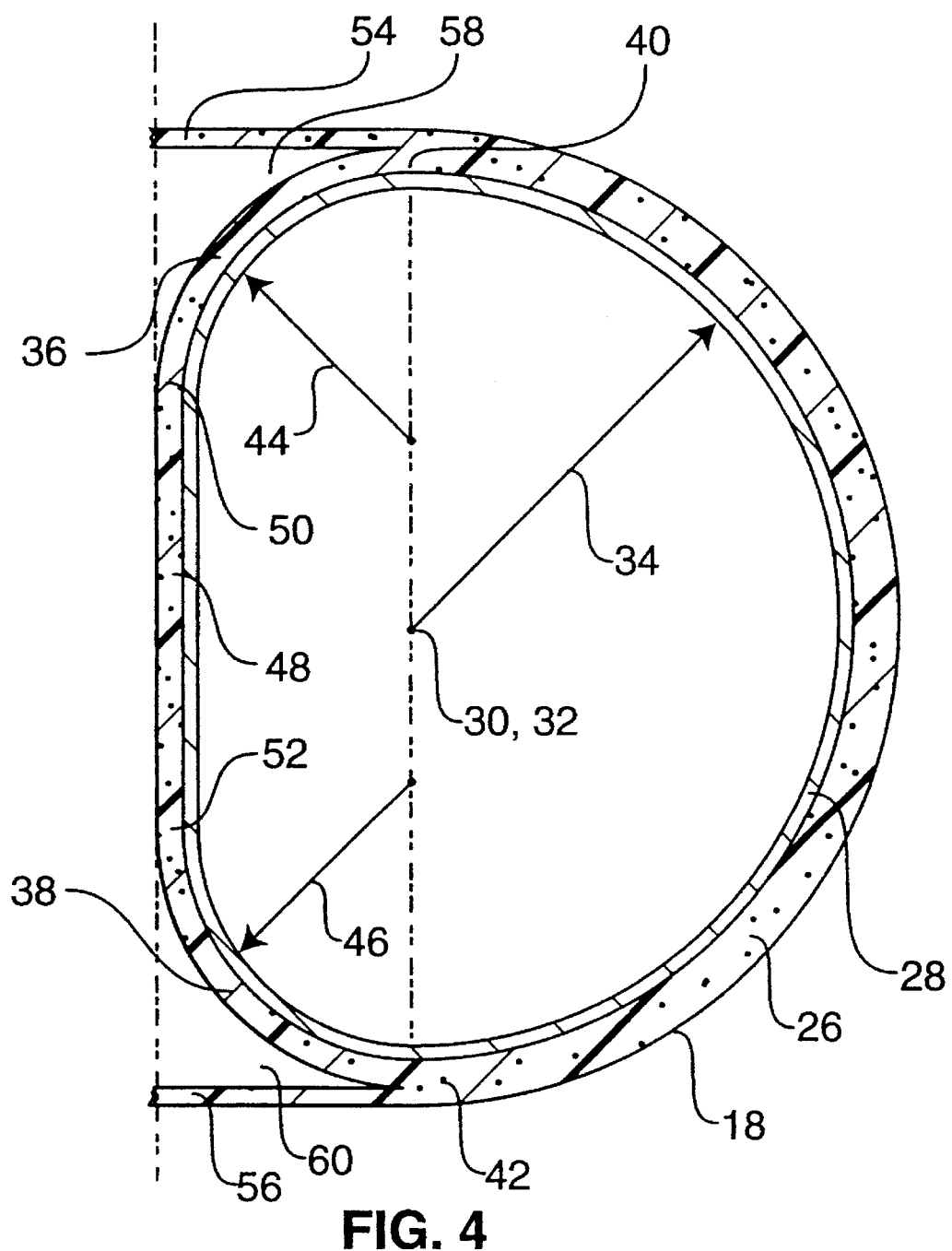
FIG. 4 is a transverse cross-section of a portion of the pressure vessel taken along line 4—4 in FIG. 3.

With reference to FIG. 4, the end cell 18 includes an outer wall 26 disposed about a liner 28. The outer wall 26 is preferably made of a composite material, such as carbon, glass, graphite, aramid, or other known fibers bound in a thermoplastic or thermoset resin such as epoxy. The liner 28 may be made of a gas impermeable material, such as a metallic foil or a synthetic polymer film.

Although the novel geometry and other characteristics of the present invention will be described with reference to the end cell 18, other cells 12 of the pressure vessel 10 also include novel features. The outer wall 26 is generally semi-cylindrical. The geometry of the outer wall 26 is defined by slicing a first cylinder with a plane through a longitudinal axis 30. The longitudinal axis 30 extends through a point 32 perpendicular to the plane of FIG. 4. The radius 34 of the outer wall 26 is thus substantially constant through an arc of about 180 degrees.

A generally quarter-cylindrical upper wall 36 and a generally quarter-cylindrical lower wall 38 are attached to the outer wall 26. The upper wall 36 is unitary with the outer wall 26 at an upper-outer junction 40, and the lower wall 38 is unitary with the outer wall 26 at a lower-outer junction 42. The quarter-cylindrical geometry of the walls 36 and 38 is defined by slicing a second and third cylinder which each have the same length as the outer wall 26 cylinder but which also have smaller tube radii 44 and 46, respectively. Each of the second and third cylinders is sliced with two perpendicular planes through its longitudinal axis to define the quarter-cylinder.

The upper half of the outer wall 26 and the upper wall 36 thus define a polyradial curve. The lower half of the outer wall 26 and the lower wall 38 define a second polyradial curve. In this presently preferred embodiment, the radius 44 of the upper wall 36 equals the radius 46 of the lower wall 38, but in alternative embodiments these radii differ. However, the radius 34 of the outer wall 26 is always larger than either of the radii 44 and 46.

A substantially straight inner wall 48 connects the upper wall 36 and the lower wall 38. The inner wall 48 is unitary with the upper wall 36 and the lower wall 38 at an upper-inner junction 50 and a lower-inner junction 52, respectively. The inner wall 48 is generally tangent to the upper wall 36 at the upper-inner junction 50 and is generally tangent to the lower wall 38 at the lower-inner junction 52.

The web 14 (FIG. 3) includes an upper sheet 54 which is generally tangent to the upper wall 36 at the upper-outer junction 40. The web 14 also includes a lower sheet 56 which is generally tangent to the lower wall 38 at the lower-outer junction 42. The upper sheet 54 and the upper wall 36 substantially define an unused volume 58 which is not used for storing pressurized fluid. The lower sheet 56 and the lower wall 38 substantially define a similar unused volume 60. The unused volumes 58, 60 are preferably substantially filled by the wedge-shaped supports 24 (FIG. 3).

Figure 3:
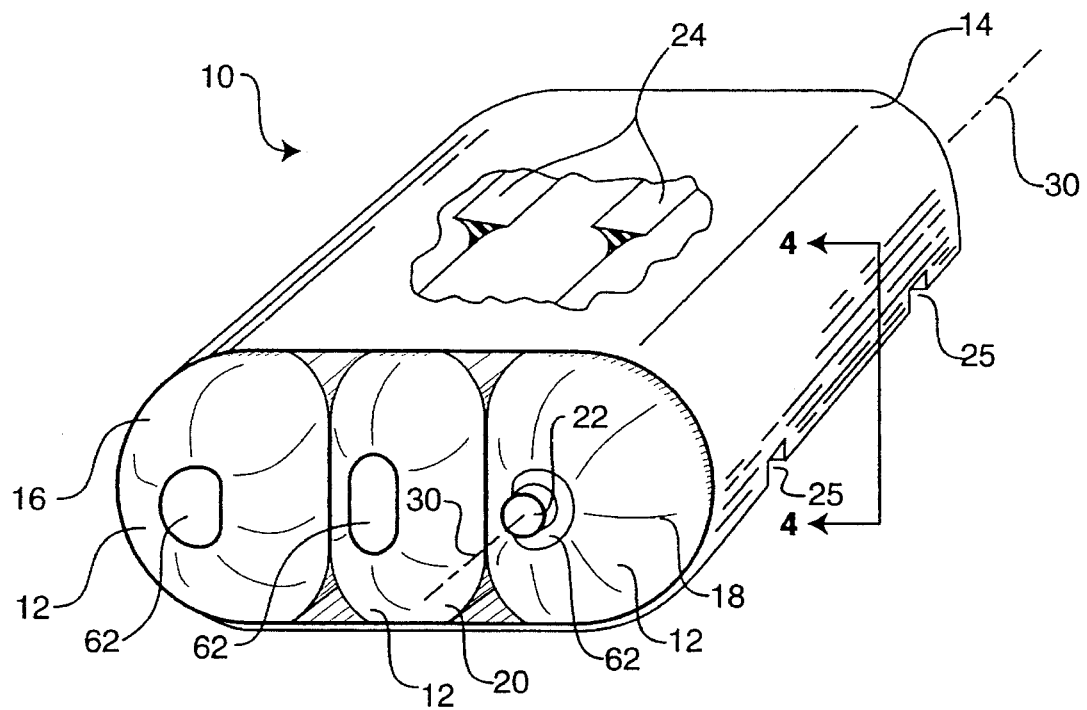
FIG. 3 is a partial cut-away perspective view of one embodiment of the pressure vessel of the present invention.

As illustrated in FIG. 3, it is presently preferred to configure each end of each cell 12 with a cap 62. In one embodiment, the caps 62 on the end cells 16, 18 have a geometry which interpolates smoothly between a portion of a sphere having a radius equal to the outer wall radius 34, on the one hand, and portions of spheres having the upper wall radius 44 and the lower wall radius 46, on the other hand. The geometry of the caps 62 on the interior cell 20 interpolates smoothly between a portion of a sphere having a radius equal to the outer wall radius 34, on the one hand, and portions of spheres having the upper wall radius 44 and the lower wall radius 46, on the other hand. In alternative embodiments, the caps 62 have different geometries which smoothly blend spheres having the three radii 34, 44, and 46.

In one embodiment, each cap 62 corresponds in shape to a hypothetical elastic sheet which is secured to the closed polyradial curve defined by the end of the cell 12 and then subjected to a uniform deformation pressure. In analytic terms, the end of the cell 12 defines a boundary condition and the shape of the cap 62 is determined by manipulating differential equations corresponding to deformation of the uniform sheet by spatially uniform forces such as gas pressure. Those of skill will appreciate that different sheet elasticities may lead to differently-sized caps, and they will readily choose between these possible shapes according to the rectangular volume being approximated and other design constraints.

Figure 5:
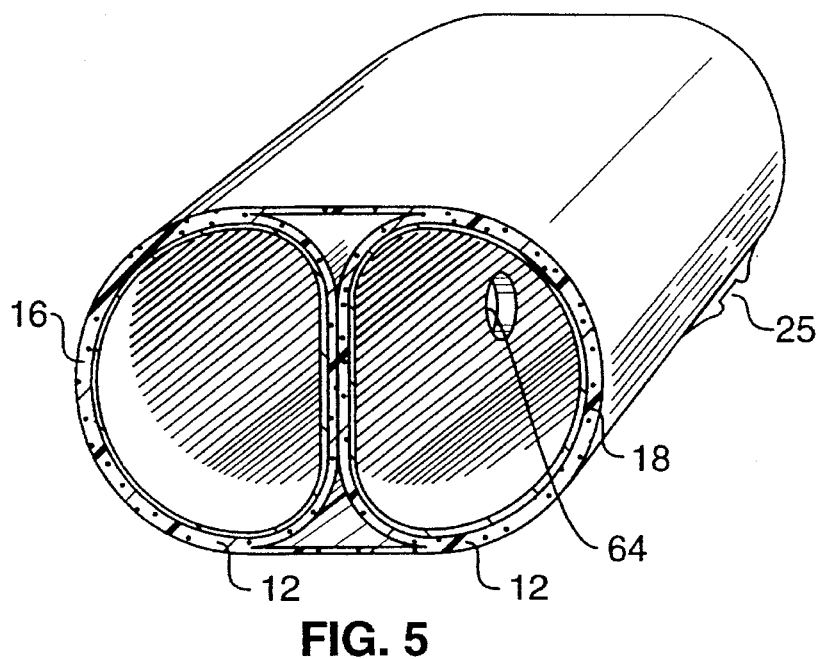
FIG. 5 is a sectioned perspective view of a first alternative embodiment of a pressure vessel of the present invention.
Figure 6:
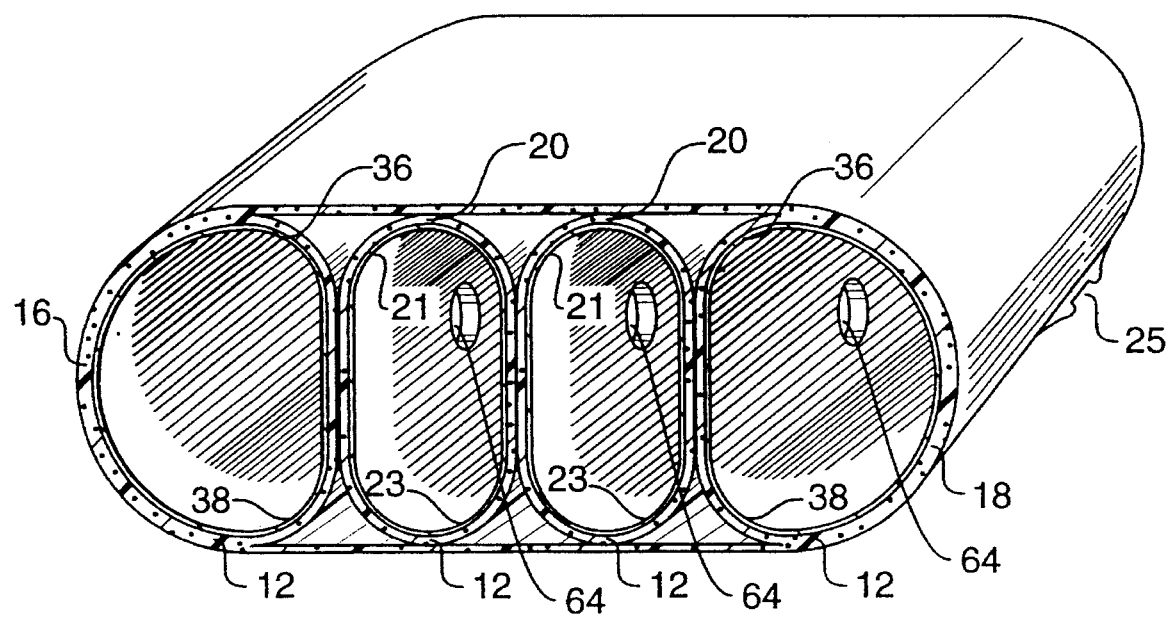
FIG. 6 is a sectioned perspective view of a second alternative embodiment of a pressure vessel of the present invention.

FIGS. 5 and 6 illustrate two alternative embodiments of the pressure vessel of the present invention. Each embodiment is shown sectioned along a line corresponding generally in position to the line 4—4 in FIG. 3. Although the embodiment shown in FIG. 5 includes a left end cell 16 and a right end cell 18, it includes no interior cell 20. By contrast, the embodiment shown in FIG. 6 includes a left end cell 16, a right end cell 18, and two interior cells 20. More generally, embodiments of the pressure vessel of the present invention may include zero or more interior cells.

As shown in FIG. 6, each interior cell 20 has a substantially semi-circular upper cross-section 21 which is generally tangent to either the upper wall 36 of an end cell 16, 18 or to the semi-circular upper cross-section 21 of another interior cell 20. Each interior cell 20 also has a substantially semi-circular lower cross-section 23 which is generally tangent to either the lower wall 38 of an end cell 16, 18 or to the semicircular lower cross-section 23 of another interior cell 20. In this embodiment, the radius of each semi-circular upper cross-section 21 substantially equals the upper wall radius of the upper walls 36.

Figure 8:
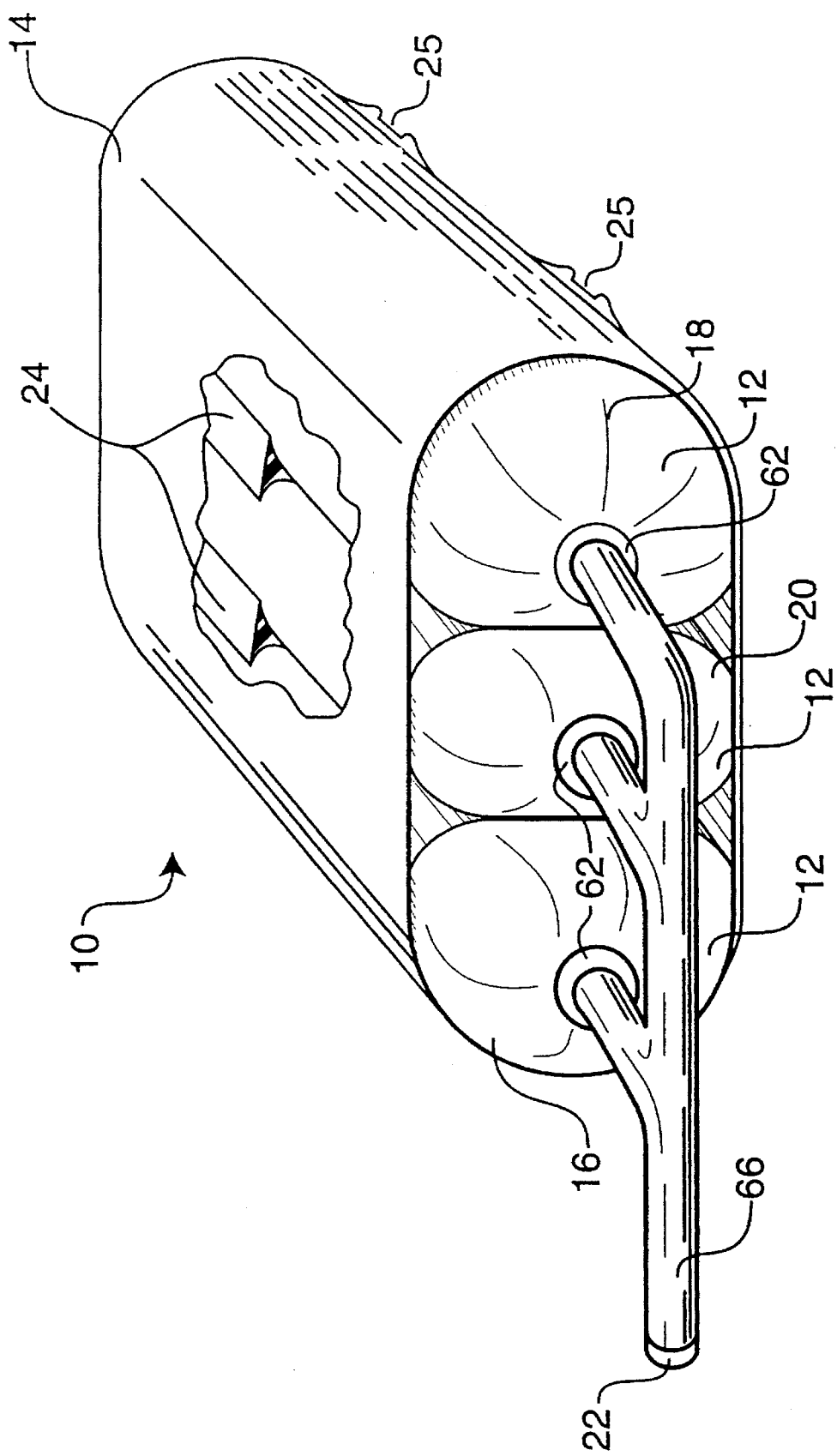
FIG. 8 is a partial cut-away perspective view of an alternative embodiment of a pressure vessel of the present invention.

As illustrated in FIGS. 5–7, the interior chambers of the cells 12 of the pressure vessels may be placed in fluid communication with one another by one or more ports 64. Thus, the pressure within the interiors of the cells 12 is equalized, and only one valve 22 is needed to control the flow of pressurized fluid in and out of the pressure vessel. An alternative embodiment, illustrated in FIG. 8, provides fluid communication between the cells 12 through an external manifold 66. The manifold is constructed of metal or other familiar materials. In this embodiment, the pressure relief valve 22 and fusible plug are integrated into the manifold 66.

Although the pressure vessels illustrated in FIGS. 3 through 6 are generally in the form of one row of cylinders, alternative embodiments employ the novel geometry of the present invention in pressure vessels having other general forms. For instance, some embodiments include generally toroidal cells which have in cross-section the novel geometry of the present invention.

Other embodiments include four end cells rather than two end cells. In such embodiments, a cross-section of each of the four end cells includes at least one polyradial curve, and may include two polyradial curves in the form of a quarter-circular outer wall that is unitary with two smaller quarter-circular walls. The web is generally tangent to the end cell at the junctions between the outer wall and the unitary smaller walls, and the various cells are generally tangent where they meet one another. Those of skill in the art may also identify other embodiments according to the teachings herein.

With reference to FIG. 7, the present pressure vessel is manufactured by methods familiar to those of skill in the art. One approach forms the cells 12 by placing the liner 28 (FIG. 4) around a mandrel (not shown) which has the desired geometry and dimensions. The desired mandrel geometry, which provides for tangential meetings between the cells 12 (see FIGS. 5 and 6) and the other novel geometric features of the present invention, is readily determined by those of skill in the art according to the teachings herein.

The desired mandrel dimensions are readily determined by those of skill in the art from information which includes the strength of the materials used to form the cells 12, the pressures the cells 12 must resist, and the dimensions of the space into which the finished pressure vessel must fit. In one embodiment, the materials used to form the cells 12 include preimpregnated graphite tow which is wound with a combination of hoop and helical windings to provide sufficient strength to resist a standard operating pressure within the pressure vessel of about 3,600 p.s.i. and a burst strength of about two to three times that pressure. The overall dimensions of this embodiment of the pressure vessel are generally those of the conventional gasoline tank (not shown) which the pressure vessel replaces. The present pressure vessel may also be utilized in applications other than retrofitting gasoline-fueled vehicles for CNG usage, in which case criteria other than the size of a conventional gasoline tank will define the desired dimensions of the pressure vessel.

After the liner 28 is placed about the mandrel, the liner 28 is overwrapped by composite material using filament winding, tube rolling, tape wrapping, automated fiber placement, or another method familiar to those of skill in the art. Aligned ports 64 may be configured in the walls of the cells 12 either by machining after the composite of the cell wall has cured or by placing the composite fibers around a suitable fixture. The valve 22 is secured to one of the end cells 18 by a metal polar boss.

The cells 12 are then positioned adjacent one another as shown in FIG. 3. The rubber or foam supports 24 are placed or glued against the cells 12. Then the cells 12 are overwrapped by the composite web 14. The web 14 includes known composite materials and is applied by filament winding or another application technique familiar to those of skill in the art.

The full assembly is then placed in a clamshell mold (not shown). The mold is generally box-shaped with silicone rubber inserts that match the inside of the box on one side and the desired exterior pressure vessel shape on the other. A combination of silicone insert expansion and pressurization of the cell liners 28 is then employed to compact the composite material to the desired shape. Those of skill in the art will appreciate that other manufacturing techniques may also be employed to form pressure vessels according to the teachings herein.

In another embodiment, the cells 12 are formed of metal by stamping, extruding, or another process familiar to those of skill in the art. The metal pieces are welded together and are then overwrapped with the composite web 14. Suitable metals include titanium, aluminum, and steel.

In summary, the present invention provides a pressure vessel which approximates the internal volume of a conventional gasoline tank. The geometry of the cells utilizes upper walls and lower walls whose radii are smaller than the radius of the outer wall. Because the cells meet tangentially, and because the web is tangential to the cells and supports the cells, the pressure vessel of the present invention has generally circular cross-sections that resist the tendency to peel apart. Moreover, the present pressure vessel conforms to the external shape of a conventional gasoline tank. The exterior of the present pressure vessel is generally rectangular and is provided with fixtures defining recesses to engage the straps that previously held the gasoline tank to the vehicle.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A pressure vessel comprising:
    at least two end cells, each end cell having a cross-section comprising:
        an arcuate outer wall defining a substantially constant outer wall radius;
        an arcuate upper wall having an end unitary with said outer wall at an upper-outer junction, said upper wall defining a substantially constant upper wall radius which is less than said outer wall radius; and
    a web secured about said end cells, said web comprising a substantially planar upper sheet which is generally tangent to said upper-outer junction of each of said end cells.

2. The pressure vessel of claim 1, wherein said end cells comprise a composite material.
3. The pressure vessel of claim 1, wherein said web comprises a composite material.
4. The pressure vessel of claim 1, wherein each of said end cells comprises a substantially semi-cylindrical portion.
5. The pressure vessel of claim 1, wherein said outer wall radius is substantially the same for each of said outer walls and said upper wall radius is substantially the same for each of said upper walls.
6. The pressure vessel of claim 1, wherein an interior cell is secured adjacent at least one of said upper walls of said end cells, and said web is secured about said interior cell.
7. The pressure vessel of claim 6, wherein a portion of said interior cell adjacent said web has a substantially semicircular upper cross-section.
8. The pressure vessel of claim 7, wherein said substantially semi-circular upper cross-section of said interior cell is generally tangent to at least one of said upper walls of said end cells.
9. The pressure vessel of claim 7, wherein a radius of said substantially semi-circular upper cross-section of said interior cell is substantially equal to said upper wall radius of at least one of said upper walls.
10. The pressure vessel of claim 1, wherein at least two interior cells are secured between said end cells, each of said upper walls of said end cells is adjacent at least one of said interior cells, and said web is secured about said interior cells.
11. The pressure vessel of claim 1, further comprising a wedge disposed between said upper sheet of said web and at least one of said upper walls for resisting forces that urge said upper sheet toward said upper wall.
12. A pressure vessel comprising:
    at least two composite end cells, each end cell having a cross-section comprising:
        an arcuate outer wall defining a substantially constant outer wall radius;
        an arcuate upper wall having an end unitary with said outer wall at an upper-outer junction, said upper wall defining a substantially constant upper wall radius which is less than said outer wall radius;
        an arcuate lower wall having an end unitary with said outer wall at a lower-outer junction, said lower wall defining a substantially constant lower wall radius which is less than said outer wall radius; and
        an inner wall having an upper end unitary with said upper wall and having a lower end unitary with said lower wall; and
    a composite web secured about said end cells, said web comprising a substantially planar upper sheet which is generally tangent to said upper-outer junction of each of said end cells, and a substantially planar lower sheet which is generally tangent to said lower-outer junction of each of said end cells.
13. The pressure vessel of claim 12, wherein said upper wall radius and said lower wall radius are substantially equal.
14. The pressure vessel of claim 12, wherein an interior cell is secured adjacent at least one of said upper walls and adjacent at least one of said lower walls, and said web is secured about said interior cell.
15. The pressure vessel of claim 14, wherein a portion of said interior cell adjacent said web has a substantially semi-circular upper cross-section which is generally tangent to said upper wall of at least one of said end cells and a substantially semi-circular lower cross-section which is generally tangent to said lower wall of the same one of said end cells.

16. The pressure vessel of claim 12, further comprising a valve capable of selectively providing fluid communication between an interior chamber of said pressure vessel and an exterior pressurized fluid line connected to said valve.

17. A pressure vessel comprising:
   at least two composite end cells, each of said end cells comprising a substantially semi-cylindrical portion, each of said end cells having a cross-section comprising:
      a substantially semi-circular outer wall having an outer wall radius;
      a substantially quarter-circular upper wall having an upper wall radius less than said outer wall radius, said upper wall having an end unitary with said outer wall at an upper-outer junction;
      a substantially quarter-circular lower wall having a lower wall radius substantially equal to said upper wall radius, said lower wall having an end unitary with said outer wall at a lower-outer junction; and
      a substantially straight inner wall having an upper end unitary with said upper wall and having a lower end unitary with said lower wall; and
   a composite web secured about said end cells, said web comprising a substantially planar upper sheet which is generally tangent to said upper-outer junction of each of said end cells, and a substantially planar lower sheet which is generally tangent to said lower-outer junction of each of said end cells.

18. The pressure vessel of claim 17, further comprising an upper wedge disposed between said upper sheet of said web and at least one of said upper walls for resisting forces that urge said upper sheet toward said upper wall, and a lower wedge disposed between said lower sheet of said web and at least one of said lower walls for resisting forces that urge said lower sheet toward said lower wall.

19. The pressure vessel of claim 17, wherein at least two interior cells are secured between said end cells, each of said upper walls of said end cells is adjacent at least one of said interior cells, and said web is secured about said interior cells.

20. The pressure vessel of claim 19, wherein a portion of each of said interior cells has a substantially semi-circular upper cross-section adjacent said upper sheet of said web, at least one of said substantially semi-circular upper cross-sections is generally tangent to at least one of said upper walls of said end cells, each of said interior cells has a substantially semi-circular lower cross-section adjacent said lower sheet of said web, and at least one of said substantially semi-circular lower cross-sections is generally tangent to at least one of said lower walls of said end cells.

21. The pressure vessel of claim 17, wherein the filled weight of said pressure vessel does not exceed the filled weight of a gasoline tank that occupies substantially the same volume envelope as said pressure vessel.

22. The pressure vessel of claim 17, wherein said pressure vessel is configured with fixtures defining exterior recesses capable of engaging gasoline tank straps which are capable of securing said pressure vessel to the vehicle.

23. The pressure vessel of claim 17, wherein said cells of said pressure vessel are configured with at least one port which provides fluid communication between the interiors of said cells.

24. The pressure vessel of claim 17, wherein said cells of said pressure vessel are configured with an external manifold which provides fluid communication between the interiors of said cells.

25. The pressure vessel of claim 17, further comprising a valve capable of selectively providing fluid communication with an interior chamber of said pressure vessel.

26. The pressure vessel of claim 25, wherein said valve comprises a fusible plug.

27. The pressure vessel of claim 25, wherein said valve comprises a mechanical pressure relief mechanism which is configured to bleed off pressurized fluid at a set predetermined pressure.

* * * * *